United States Patent [19]

Srackangast

[11] Patent Number: 5,308,192
[45] Date of Patent: May 3, 1994

[54] METHOD AND APPARATUS FOR REHABILITATING SEWAGE MANHOLES

[75] Inventor: James V. Srackangast, Concord, N.C.

[73] Assignee: Tru-Contour, Inc., Harrisburg, N.C.

[21] Appl. No.: 40,211

[22] Filed: Apr. 1, 1993

[51] Int. Cl.⁵ .................. E02D 29/12; F16L 1/00
[52] U.S. Cl. .................... 405/154; 285/15; 285/269; 405/36; 405/52; 405/303
[58] Field of Search ............ 405/52, 53, 154, 184; 285/15, 16, 369, 372

[56]  References Cited

U.S. PATENT DOCUMENTS

| | | | |
|---|---|---|---|
| 3,850,457 | 11/1974 | Bigotte et al. | |
| 4,323,526 | 4/1982 | Hilbush | 285/15 X |
| 4,427,112 | 1/1984 | Di Giovanni et al. | 285/15 X |
| 4,538,841 | 9/1985 | Royston | 285/372 |
| 4,639,016 | 1/1987 | Rogers et al. | 285/15 |
| 5,002,438 | 3/1991 | Strong | |

OTHER PUBLICATIONS

Strong Manufacturing Co., Inc. brochure "Inflow? A System for Manhole Restoration That Stops I&I, Restores Structural Integrity, Protects Against Corrosion... And Is Affordable!", Dec. 1990, pp. 1-4.
Monoform, Inc. outline consisting of 3 pages, undated.
Monoform, Inc. brochure "Manhole Liner Forming System", pp. 1-5, undated.
Monoform, Inc. information sheet entitled "Manhole Liner Forming System—Use 'No Dig' Technology", undated.
C-Mar Northwest, Inc. brochure "C-Mar Manhole Reconstruction Processes—Utilizing 'No Dig' and Non Disruptive Techniques", pp. 1-4, undated.

Primary Examiner—Dennis L. Taylor
Attorney, Agent, or Firm—Shefte, Pinckney & Sawyer

[57] ABSTRACT

Sewage manholes having a deteriorated or defective manhole housing which is subject to undesired ground water infiltration are rehabilitated by inserting annularly expandable tubular sleeve assemblies partially into each inflow and outflow pipe of the manhole, connecting the sleeve assemblies to one another via an annularly-closed tubular conduit or network of tubular conduits and then sealing the sleeve assemblies to the inflow and outflow pipes and to the tubular conduit or conduits to form a fluid flow path between the inflow and outflow pipes which is sealably enclosed against water infiltration and sewage exfiltration.

18 Claims, 4 Drawing Sheets

METHOD AND APPARATUS FOR REHABILITATING SEWAGE MANHOLES

BACKGROUND OF THE INVENTION

The present invention relates generally to the construction of sewage manholes such as are utilized in municipal sewage and waste water handling systems and, more particularly, to a method and apparatus for rehabilitating deteriorated or otherwise defective sewage manholes.

In a typical municipal sewage handling system, an extensive network of underground pipes are provided to carry sewage and other waste waters to a municipal waste water treatment facility or other suitable treatment facility to purify the water for return to the municipal water supply. While the input of sewage per se into a municipality's water treatment system is generally predictable, the impact of fluctuations in rainfall and the resultant surface water run-off into a sewer system is highly unpredictable and, during periods of heavy rainfall, can overload a municipality's water treatment system. For example, it is not uncommon for a municipal treatment facility to receive on a rainy day two to three times the volume of sewage water received on a normal day without rain.

This problem of handling sewage water fluctuations due to intermittent rainfall can be significantly compounded by the presence in a municipality's sewer system of old deteriorating manhole structures and other manhole structures which may otherwise be defective and leaky because of faulty workmanship, settling, or other reasons. Local municipal ordinances and codes uniformly require the provision of manholes at periodic intervals along sewer lines to provide access into the sewer system when necessary to remove blockages, perform repairs, and correct other periodic problems. Generally, such manholes are subterranean structures which may be of a cast concrete construction or, in older manholes, may be of a brick and mortar construction. In either case, manholes should be sufficiently water-tight to prevent infiltration of ground water into the sewer system by seepage through the walls of the manhole. However, over time, the gases which are typically present in sewage, especially sulphide gas, gradually corrode and deteriorate mortar and concrete in manholes, to the point of ultimately permitting a substantial degree of ground water infiltration. Also, relatively new manholes can be subject to leakage and infiltration due to poor workmanship, earth shifting, or settling and like reasons. During periods of rainy weather, it is not uncommon for water infiltration through a single deteriorated or defective manhole to amount to ten to twenty gallons per hour and, thus, over an entire municipal sewer system, deteriorated and defective manholes can substantially contribute to overloading of a municipality's water treatment facility, the cost of which in turn is ultimately borne by the taxpayers.

Various means have been proposed for addressing the problem of deteriorated and defective manholes. The most obvious but most extreme and costly solution is to excavate, remove, and completely rebuild a deteriorated and defective manhole. A common alternative which is less extreme but still nevertheless costly is to construct a new water tight interior lining within the interior of an existing manhole's original wall structure. While these techniques can be generally effective for their intended purpose, the cost of implementing these solutions on a system-wide basis is viewed by many municipalities as being cost prohibitive. Accordingly, a substantial need exists for a simple and inexpensive yet effective means for rehabilitating deteriorated and defective manholes which will enable municipalities to minimize the strain imposed on water treatment facilities by ground water infiltration of manholes.

SUMMARY OF THE INVENTION

It is accordingly, an object of the present invention to provide a novel method and apparatus by which sewage manholes having a deteriorated or defective manhole housing structure can be inexpensively yet reliably rehabilitated without the conventional need to reconstruct or supplement the wall structure of the manhole housing.

Briefly summarized, the method and apparatus of the present invention provide tubular sleeves which can be axially inserted partially into each of the inflow and outflow pipes opening into the interior area of a manhole housing structure so as to leave an exposed free end of each sleeve projecting into the manhole interior, at least one substantially annularly-closed tubular conduit which can be connected between the exposed free ends of the sleeves within the manhole interior, and a suitable arrangement for sealing each sleeve with respect to the respective pipe in which the sleeve is inserted and with respect to the tubular conduit with which the sleeve is connected. In this manner, the present method and apparatus enable a fluid flow path to be created between the inflow and outflow pipes which is sealably enclosed against infiltration by water and other fluids entering the interior area of the manhole housing structure and against exfiltration of sewage flowing through the pipes and the tubular conduit, without any need to repair, reconstruct, or otherwise modify the manhole housing structure itself.

In the preferred embodiment of the present invention, the tubular conduit is configured so as to be connectable to the free ends of the sleeves by insertion of the sleeves' respective free ends into respective ends of the tubular conduit. Each sleeve is selectively expandable annularly for interior engagement within the respective pipe and the respective end of the tubular conduit in which the sleeve is inserted. For sealing purposes, a resilient sealing ring is disposed annularly between each sleeve and the respective pipe in which the sleeve is inserted and between the sleeve and the respective end of the tubular conduit in which the sleeve is inserted. Additionally, clamps are provided for clamping each end of the tubular conduit annularly about the free end of the respective sleeve.

Preferably, each sleeve includes an annularly resilient sleeve body which is split axially along its length forming axially adjacent facing lengthwise split edges and also includes a sleeve expanding mechanism in the form of a device for selectively spreading the split edges apart to annularly expand the sleeve body. A bridge member is provided for spanning between and sealing the split edges. The tubular conduit is preferably flexible so as to be capable of assuming differing configurations for conforming to differing manhole structures. A vent may be provided in the tubular conduit to permit sewer gases to escape.

In manhole structures having a combination of three or more incoming and outgoing pipes the tubular conduit would preferably be in the form of a corresponding number of flexible conduit legs for connection to respective sleeves inserted within the incoming and outgoing pipes and a fitting which communicates the conduit legs with one another.

DESCRIPTION OF THE PREFERRED EMBODIMENT

Figure 1:
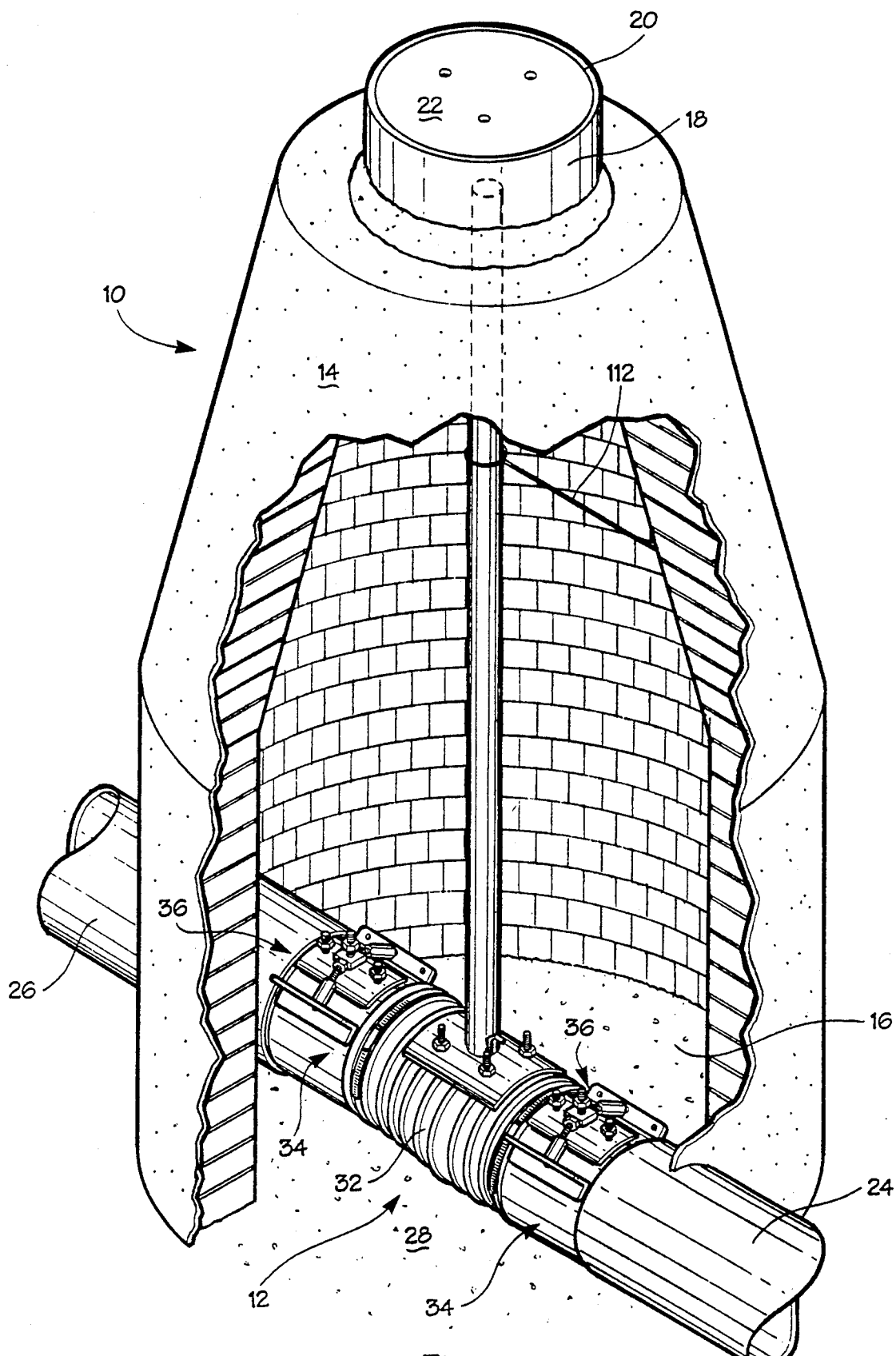
FIG. 1 is a perspective view of the manhole rehabilitating apparatus of the present invention as preferably installed in a manhole, which is illustrated as being partially broken away in order to show the present rehabilitating apparatus.

Referring now to the accompanying drawings and initially to FIG. 1, a conventional sewage manhole structure of the type in which the rehabilitating apparatus and method of the present invention would be utilized is shown generally at 10, with the present apparatus installed therein and shown generally at 12.

The manhole 10 basically is constructed with an upright cylindrical housing structure 14, which may be of brick-and-mortar construction as shown or cast concrete, defining an interior area 16 sufficiently large to accommodate at least one or two workers. The upper end of the housing structure 14 tapers to a cylindrical collar 18 which defines an access opening 20 into the interior area 16 and which also supports a removable cover plate 22. A concrete floor 28 is cast at the lower end of the housing structure 14 and at least one inflow pipe 24 and at least one outflow pipe 26 open through the cylindrical side wall of the housing structure 14 adjacent the floor 28. The floor 28 may be formed with a semicircular trough 30 (not shown), commonly referred to as a manhole invert, to provide directional flow of sewage and waste water through the interior area 16 from the inflow pipe 24 to the outflow pipe 26.

The manhole 10 as illustrated and above-described is a typical common manhole construction, but as those persons of skill in the art will readily recognize and understand, numerous other forms of manhole construction exist and it is contemplated that the present invention will be adaptable to virtually any conventional manhole construction. Thus, the manhole 10 as illustrated and described is to be understood to merely be representative for purposes of providing an enabling disclosure and understanding of the present invention.

Figure 2:
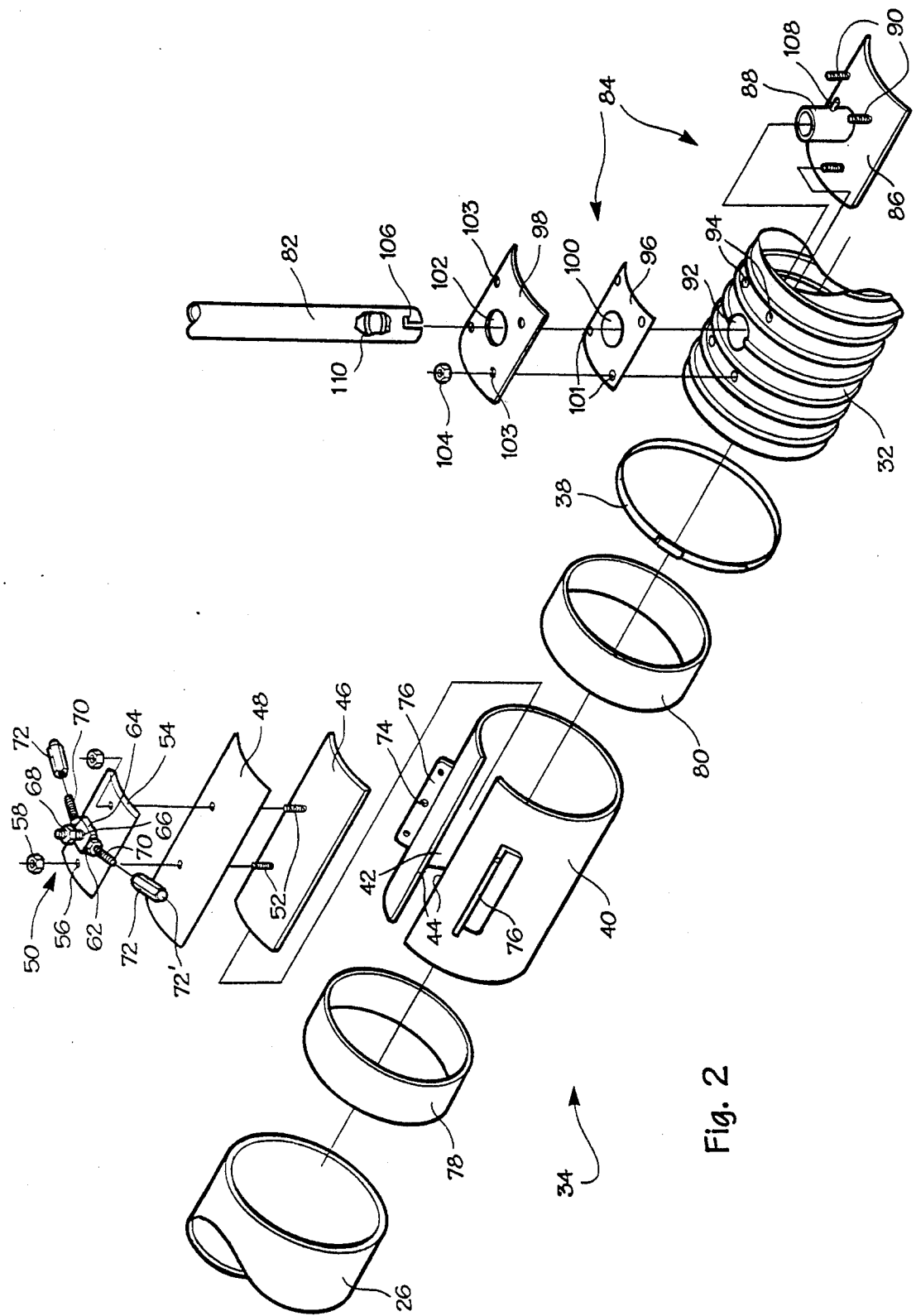
FIG. 2 is an exploded perspective view of one end of the rehabilitating apparatus of FIG. 1.
Figure 3:
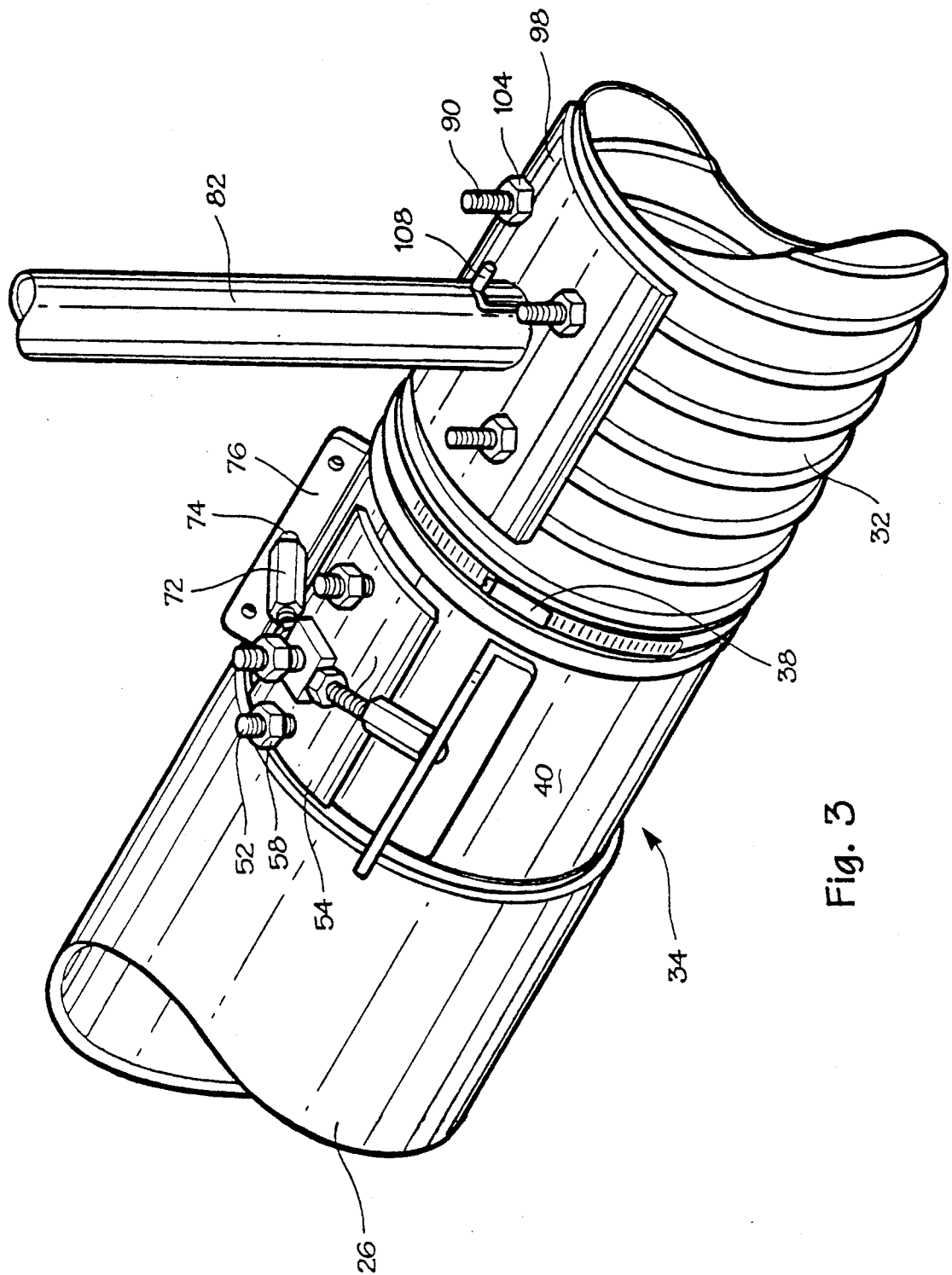
FIG. 3 is an assembled perspective view of the exploded elements of the present apparatus shown in FIG. 2.

With additional reference to FIGS. 2 and 3, the rehabilitating apparatus 12 basically includes a flexible tubular conduit 32 arranged to extend between the inflow and outflow pipes 24,26, in conjunction of a pair of tubular sleeve assemblies 34 inserted respectively into the open ends of the inflow and outflow pipes 24,26 and into the opposite ends of the flexible conduit 32. Each sleeve assembly 34 includes a sealing arrangement, generally indicated at 36, for sealing the sleeve assemblies 34 with respect to the respective pipes 24,26 and the conduit 32. In addition, annular band-type clamps 38 are provided about opposite ends of the conduit 32 for clamping the opposite ends of the conduit annularly about the sleeve assemblies 34.

The flexible tubular conduit 32 may be of various conventional constructions which are water tight and corrosion-resistant and have sufficient strength to withstand internal and external pressures and loads imposed by sewage flow therethrough and sufficient lengthwise bending flexibility to conform to differing angular relationship between inflow and outflow pipes in differing manholes. As will be fully explained hereinafter, the tubular conduit should be substantially annularly-closed. Presently, it is preferred that the tubular conduit be of the conventional type having a flexible spiral reinforcing wire covered interiorly and exteriorly by a water impermeable, non-corrosive polymeric material. Advantageously, such conduit is manufactured in elongate extended lengths which can be readily cut to any desired lengthwise dimension, so that the conduit is capable of accommodating various manhole dimensions and configurations.

Each sleeve assembly 34 includes a cylindrical sleeve body 40 which is split axially along its length as indicated at 42 to present a pair of axially adjacent facing lengthwise split edges 44. The sleeve body should be formed of a relatively rigid material which has sufficient resiliency to annularly expand in response to any force spreading the split edges 44 away from one another and then to return to its original annular dimension upon removal of any such force. For example, any corrosion resistant sheet metal material such as aluminum or stainless steel would suffice for fabrication of the sleeve body 40.

Each sleeve assembly 34 additionally includes an elongate bridge plate 46 of a lengthwise dimension corresponding to the axial dimension of the sleeve body 40 and being arcuately curved in its widthwise dimension to span between the split edges 44 of the sleeve body 40. The bridge plate 46 has a layer of malleable sheet-like mastic material 48 extending co-extensively lengthwise and widthwise over the convex face of the bridge plate 46. The mastic covered bridge plate 46 is disposed axially within the sleeve body 40 at the location of the split 42, with the mastic-covered convex surface of the bridge plate 46 facing and adhering to the radially inward surfaces of the sleeve body 40 adjacent the split edges 44.

Each sleeve assembly 34 includes a mechanism, generally indicated at 50, by which the sleeve body 40 may be selectively expanded and contracted annularly. Specifically, the expanding-contracting mechanism 50 includes a pair of threaded studs 52 affixed rigidly to and extending perpendicularly from the convex face of the bridge plate 46 outwardly through the mastic material 48 and between the split edges 44 of the sleeve body 40. An arcuate bracket plate 54 spans the split 42 over the radially outward surface of the sleeve body 40 and is formed with a pair of holes 56 through which the threaded studs 52 are received. The bracket plate 54 is secured in assembly with the sleeve body 4 and the bridge plate 46 by a pair of nuts 58 threaded on the studs 52 radially outwardly of the bracket plate 54. Another threaded stud 60 is rigidly affixed to and extends outwardly from the outwardly-facing convex surface of the bracket plate 54. An expanding device 62 has a central body 64 formed with an opening 66 therethrough by which the expanding device 62 is secured on the stud 60 by another nut 68. A pair of threaded arms 70 extend laterally outwardly from opposite sides of the expanding device body 64 and threadedly carry a respective pair of elongate bullet-nosed nuts 72 which have a hexagonal-shaped periphery to permit threaded rotation on the arms 70 by means of a conventional wrench or like tool. The outwardly facing noses 72' of the nuts 72 are received in respective openings 74 formed in a pair of flanges 76 affixed to the outer periphery of the sleeve body 40 laterally adjacent the respective split edges 44.

Each sleeve assembly 34 additionally carries a pair of cylindrical rubber or synthetic rubber sealing rings 78,80 annularly about the opposite ends of the sleeve body 40 outwardly adjacent the flanges 76 for respective sealing contact with the annular interior surfaces of a pipe 24 or 26 and the flexible tubular conduit 32, as more fully described hereinafter.

The installation and operation of the rehabilitation apparatus 12 in a deteriorated or defective manhole may thus be understood. Initially, an annularly-contracted sleeve assembly 34 is partially inserted into each inflow and outflow pipe 24,26 opening into the manhole's housing structure, each sleeve assembly 34 being inserted to a sufficient axial extent to dispose one of its sealing rings 78 fully within the annular interior of the respective pipe but leaving the expanding-contracting mechanism 50 and the sealing ring 80 at the opposite end of the sleeve assembly 34 exposed within the interior area 18 of the manhole housing structure 14. Then, the opposite ends of the flexible tubular conduit 32 are slipped annularly over the respective exposed free ends of the sleeve assemblies 34 to fully encircle the other sealing rings 80 of the sleeve assemblies 34. The band clamps 38 are loosely situated annularly about the ends of the tubular conduit 32. With the rehabilitation apparatus 12 thusly in place, the bullet-nosed nuts 72 on the expanding-contracting mechanisms 50 of the sleeve assemblies 34 are threadedly rotated by means of a wrench or other suitable tool to move the respective nuts 72 outwardly, thereby acting through the flanges 76 to spread apart the split edges 44 and annularly expand the sleeve bodies 40, until the sealing rings 78,80 are brought into compressed sealing engagement between the sleeve bodies 40 and the interior surfaces of the pipes 24,26 and the tubular conduit 32. The nuts 58 of each sleeve assembly are then tightened on the studs 52 to clamp the plate 46 against the interior of the sleeve body 40 and compress the mastic material 48 into conformity with the split edges 44 and the sealing rings 78,80 thereby to complete the seal between each sleeve assembly and the respective pipe 24,26. The clamps 38 are tightened about the ends of the tubular conduit 32 to ensure a secure seal with the sealing rings 80.

As thusly installed, the rehabilitation apparatus 12 forms a substantially sealed and enclosed fluid flow path between the inflow and outflow pipes 24,26 which cannot be penetrated by ground water which infiltrates the manhole interior area 16 and also prevents any risk of exfiltration of sewage outwardly through the deteriorating or defective manhole structure which could potentially occur during high flow periods, e.g., during heavy rains. Thus, while the deteriorated or defective manhole structure remains subject to ground water infiltration, inflowing ground water will not enter the sewer system and therefore will not additionally burden the sewer and water treatment system in which the manhole is situated, but rather will gradually exfiltrate outwardly through the manhole structure and/or evaporate. As will thus be understood, the present rehabilitation apparatus and method utilizes simple, uncomplicated, and inexpensive materials which are easy and quick to install with minimal labor and skill required and therefore represents an effective and inexpensive solution to manhole rehabilitation problems. Likewise, if access into the sewer system is necessary for repairs or inspection, the rehabilitation apparatus may be readily disassembled when desired.

To permit sewer gases to escape upwardly through the manhole cover plate 22 in a normal fashion, a vent pipe 82 is attached to the tubular conduit 32 by a vent assembly 84. The vent assembly 84 includes an arcuately convex support plate 86 on which a vent tube 88 and four threaded studs 90 are welded in upstanding disposition. The support plate 86 is disposed interiorly within the tubular conduit 32 in abutting contact with the inside surface thereof, with the vent tube 88 and the studs 90 extending radially outwardly through respective openings 92,94 in the tubular conduit 32. A layer of mastic material 96 and a clamping plate 98, each dimensioned and shaped in correspondence to the support plate 86 and each having openings 100,101 and 102,103, respectively, corresponding to the openings 92,94 in the tubular conduit 32, are affixed securely to the support plate 86 at the exterior of the tubular conduit 32 by nuts 104 threadedly secured on the studs 90. The mastic material 96 is thereby sandwiched between the support and clamping plates 86,98 to seal the openings 92,94 in the tubular conduit 32 The vent pipe 82 telescopically fits over the upstanding vent tube 88 and is formed with an L-shaped notch 106 in its lower end to receive a pin 108 on the tube 88 for retaining the vent pipe 82 and the tube 88 against unintended disassembly. Also, the notch 106 permits the vent pipe to be selectively removed if or as necessary or desirable to drain standing water in the manhole into the sewer system throughout the vent tube 88. A seal ring 110 is fitted between the telescoped vent pipe 82 and tube 88 to seal them with respect to each other. As needed, one or more braces 112 extend between the vent pipe 82 and the interior wall of the manhole housing structure 14 to stabilize the vent pipe 82 in upstanding disposition, thus directing gases from within the sewer pipes 24,26 to escape upwardly through the cover plate 22.

Figure 4:
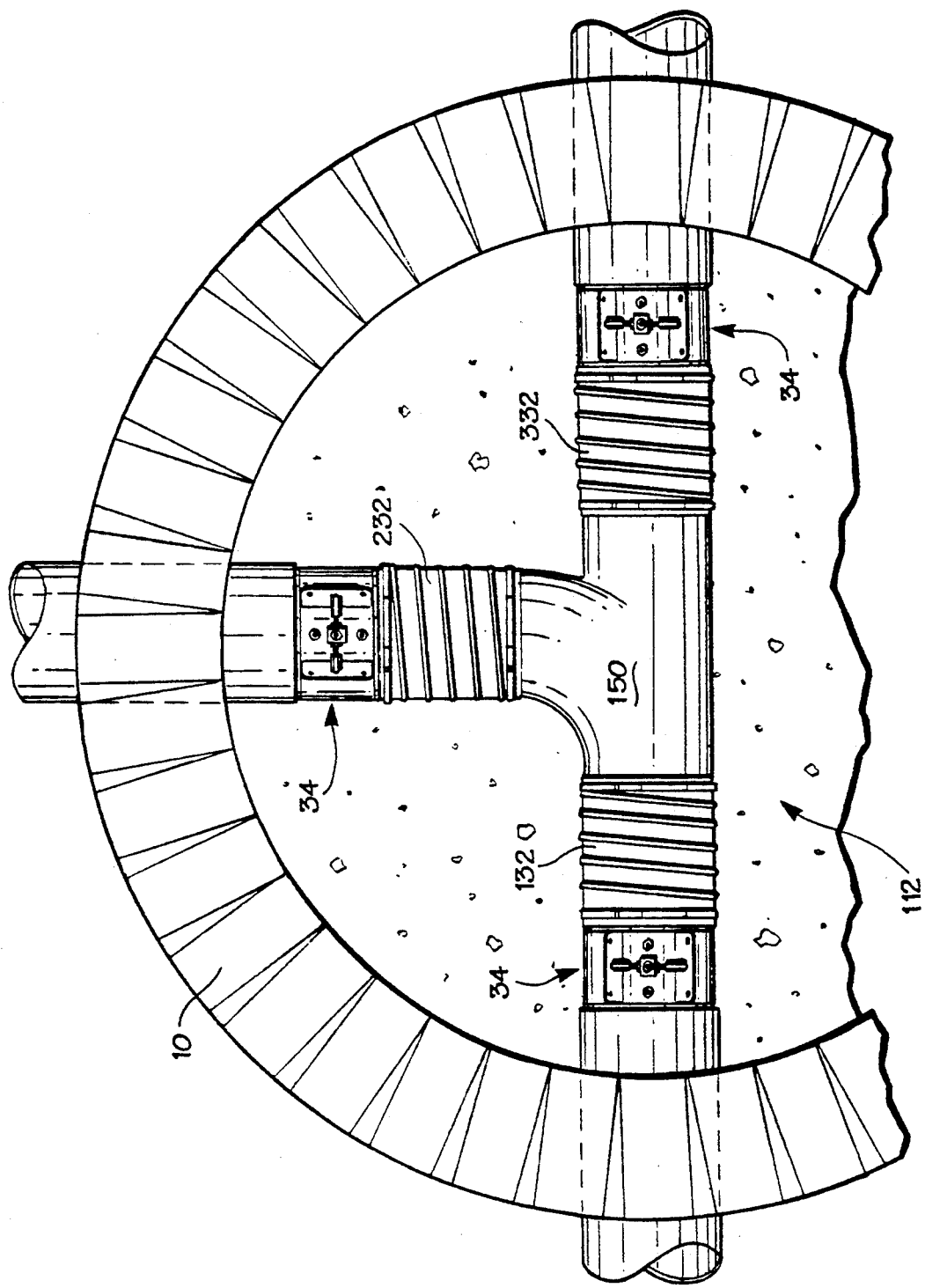
FIG. 4 is a plan view illustrating an alternative embodiment of the apparatus of the present invention.

As previously mentioned, conventional manholes may be of varying dimensions and constructions and may have varying numbers of incoming and outgoing pipes. The manhole 10 of FIG. 1 having a single inflow pipe and a single outflow pipe is illustrated and described herein for sake of simplicity in disclosing the structure and operation of the present invention. However, it is to be understood that the present apparatus and method is equally applicable to rehabilitating other conventional manholes having more than two incoming and outgoing pipes. By way of example, FIG. 4 illustrates in plan view an alternative embodiment of rehabilitation apparatus 112 of the present invention adapted for use in rehabilitating a conventional three-way manhole, i.e., having two inflow pipes and one outflow pipe or, alternatively, one inflow pipe and two outflow pipes. As in the embodiment of FIGS. 1-3, sleeve assemblies 34 are provided for each inflow and outflow pipe. However, instead of a single continuous flexible tubular conduit 32, a tubular conduit assembly is provided using a three-way fitting 150 and three tubular conduit sections 132,232,332 clamped to the respective openings of the fitting 150 and, in turn, connected to the respective sleeve assemblies 34 within the inflow and outflow pipes. As will thus be understood, by fabrication of an appropriate conduit fitting compatible to a particular type of conventional manhole structure, the rehabilitation apparatus and method of the present invention may be adapted for use with substantially any given conventional manhole construction.

It will therefore be readily understood by those persons skilled in the art that the present invention is susceptible of broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

I claim:

1. A method for rehabilitating sewage manholes having a manhole housing structure defining an interior area which is subject to undesired infiltration of water and fluids through the manhole housing structure, wherein at least one inflow pipe and at least one outflow pipe open through the manhole housing structure into the interior area, the method comprising the steps of:
   a) partially inserting a respective sleeve axially into each of the inflow and outflow pipes, leaving an exposed free end of each of the sleeves projecting into the interior area of the manhole housing structure,
   b) connecting at least one substantially annularly-closed tubular conduit between the exposed free ends of the sleeve within the interior area of the manhole housing structure, and
   c) sealing each sleeve with respect to the respective pipe in which the sleeve is inserted and with respect to the tubular conduit with which the sleeve is connected to form a fluid flow path between the inflow and outflow pipes which is sealably enclosed against infiltration by water and other fluids entering the interior area of the manhole housing structure and against exfiltration of sewage flowing through the pipes and the tubular conduit.

2. A method for rehabilitating sewage manholes according to claim 1 wherein the step of connecting the tubular conduit between the free ends of the sleeves comprises inserting the free ends of the sleeves into respective ends of the tubular conduit.

3. A method for rehabilitating sewage manholes according to claim 2 wherein the step of sealing each sleeve comprises expanding each sleeve annularly into engagement interiorly with the respective pipe.

4. A method for rehabilitating sewage manholes according to claim 2 wherein the step of sealing each sleeve comprises compressing a resilient sealing ring between the sleeve and the respective pipe in which the sleeve is inserted and between the sleeve and the respective end of the tubular conduit in which the sleeve is inserted.

5. A method for rehabilitating sewage manholes according to claim 2 wherein the step of sealing each sleeve comprises clamping each end of the tubular conduit annularly about the free end of the respective sleeve.

6. A method for rehabilitating sewage manholes according to claim 1 and further comprising the step of venting the tubular conduit to permit escape of sewer gases.

7. Apparatus for rehabilitating sewage manholes having a manhole housing structure defining an interior area which is subject to undesired infiltration of water and fluids through the manhole housing structure, wherein at least one inflow pipe and at least one outflow pipe open through the manhole housing structure into the interior area, the apparatus comprising:
   a) a plurality of tubular sleeves corresponding in number to the inflow and outflow pipes, the sleeves being configured and dimensioned for partial insertion axially into the respective inflow and outflow pipes, leaving an exposed free end of each of the sleeves projecting into the interior area of the manhole housing structure,
   b) at least one substantially annularly-closed tubular conduit configured and dimensioned for connection between the exposed free ends of the sleeves within the interior area of the manhole housing structure, and
   c) an arrangement sealing each sleeve with respect to the respective pipe in which the sleeve is inserted and with respect to the tubular conduit with which the sleeve is connected to form a fluid flow path between the inflow and outflow pipes which is sealably enclosed against infiltration by water and other fluids entering the interior area of the manhole housing structure and against exfiltration of sewage flowing through the pipes and the tubular conduit.

8. Apparatus for rehabilitating sewage manholes according to claim 7, wherein the tubular conduit includes respective ends into which the free ends of the sleeves can be inserted.

9. Apparatus for rehabilitating sewage manholes according to claim 7 wherein the tubular conduit is a flexible conduit.

10. Apparatus for rehabilitating sewage manholes according to claim 7 wherein the tubular conduit has at least three ends for connection to respective free ends of three of the sleeves and a fitting communicating the conduit ends with one another.

11. Apparatus for rehabilitating sewage manholes according to claim 7, wherein each sleeve comprises a mechanism for expanding the sleeve annularly into engagement interiorly with the respective pipe.

12. Apparatus for rehabilitating sewage manholes according to claim 11 wherein each sleeve includes an annularly resilient sleeve body which is split axially along its length, forming axially adjacent facing lengthwise split edges and the sleeve expanding mechanism comprises a device for selectively spreading the split edges apart to annularly expand the sleeve body.

13. Apparatus for rehabilitating sewage manholes according to claim 12 wherein each sleeve further comprises a bridge member for spanning between and sealing the split edges.

14. Apparatus for rehabilitating sewage manholes according to claim 8 wherein the sealing arrangement includes a resilient sealing ring between each sleeve and the respective pipe in which the sleeve is inserted and between each sleeve and the respective end of the tubular conduit in which the sleeve is inserted.

15. Apparatus for rehabilitating sewage manholes according to claim 8 wherein the sealing arrangement includes a clamp for annularly clamping each end of the tubular conduit about the free end of the respective sleeve.

16. Apparatus for rehabilitating sewage manholes according to claim 7 and further comprising a vent in the tubular conduit to permit escape of sewer gases.

17. A method for rehabilitating sewage manholes having a manhole housing structure defining an interior area which is subject to undesired infiltration of water and fluids through the manhole housing structure, wherein at least one inflow pipe and at least one outflow pipe open through the manhole housing structure into the interior area, the method comprising the steps of connecting at least one substantially annularly-closed tubular conduit between the inflow and outflow pipes, sealing the tubular conduit with respect to the respective pipes to form a fluid flow path between the inflow and outflow pipes which is sealably enclosed against infiltration by water and other fluids entering the interior area of the manhole housing structure and against exfiltration of sewage flowing through the pipes and the tubular conduit.

18. Apparatus for rehabilitating sewage manholes having a manhole housing structure defining an interior area which is subject to undesired infiltration of water and fluids through the manhole housing structure, wherein at least one inflow pipe and at least one outflow pipe open through the manhole housing structure into the interior area, the apparatus comprising at least one substantially annularly-closed tubular conduit configured and dimensioned for connection between the inflow and outflow pipes, and an arrangement sealing the tubular conduit with respect to the respective pipes to form a fluid flow path between the inflow and outflow pipes which is sealably enclosed against infiltration by water and other fluids entering the interior area of the manhole housing structure and against exfiltration of sewage flowing through the pipes and the tubular conduit.

* * * * *